No. 690,835. Patented Jan. 7, 1902.
J. L. CLAYLAND.
ENGINE SHAFT.
(Application filed Mar. 25, 1901.)
(No Model.)
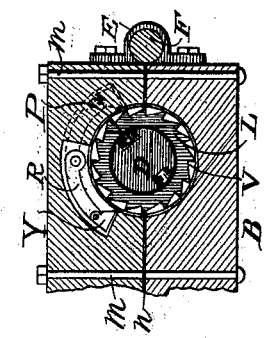
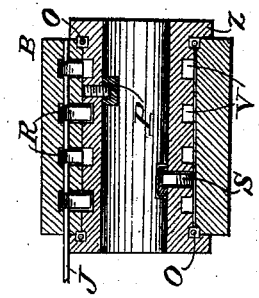
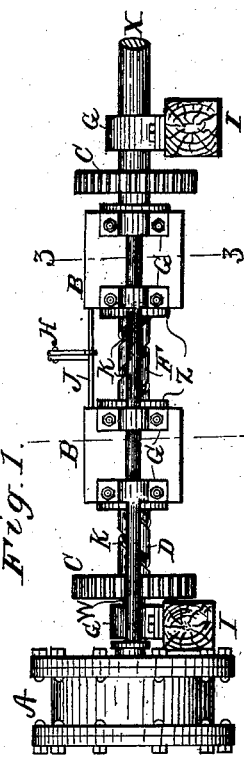
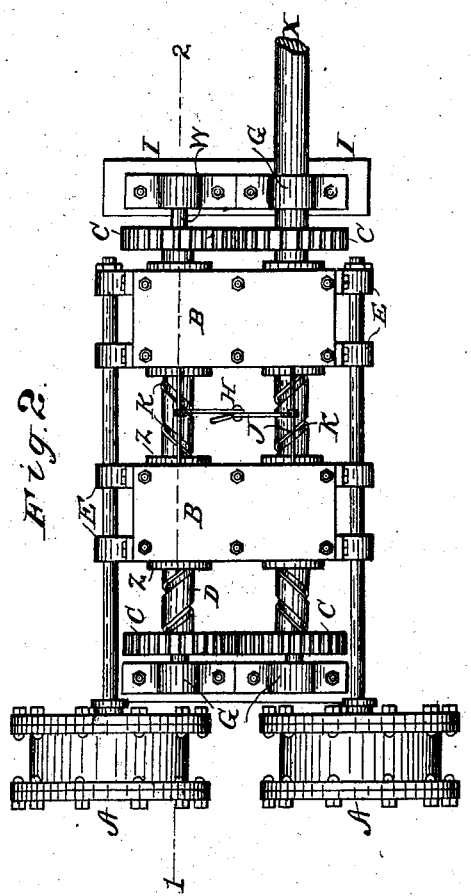
WITNESSES:
W. R. Edelin.
Amos W. Hart
INVENTOR
James L. Clayland.
BY Munn & Co.
ATTORNEYS

United States Patent Office.

JAMES L. CLAYLAND, OF FORT SMITH, ARKANSAS.

ENGINE-SHAFT.

SPECIFICATION forming part of Letters Patent No. 690,835, dated January 7, 1902.

Application filed March 25, 1901. Serial No. 52,828. (No model.)

*To all whom it may concern:*

Be it known that I, JAMES L. CLAYLAND, a citizen of the United States, residing at Fort Smith, in the county of Sebastian and State of Arkansas, have invented a new and useful Shaft for Marine and other Engines, of which the following is a specification.

My invention relates to that class of mechanism by which reciprocating motion is converted into rotary, and is particularly applicable to marine and other engines as a substitute for the ordinary crank-shaft. As is well known, the ordinary crank has but two points where full power is exerted and two "dead" points or centers where no power is applied.

The invention is embodied in the construction, arrangement, and combination of parts hereinafter described whereby the reciprocating motion of two pistons is applied to two spirally-grooved shafts through the medium of rotatable sleeves or hollow cylinders carrying a device which engages the spiral grooves.

The details are as follows, reference being had to the accompanying drawings, in which—

Figure 1 is a side view of an apparatus embodying my invention. Fig. 2 is a plan view. Fig. 3 is a transverse section on the line 3 3 of Fig. 1. Fig. 4 is a longitudinal section at right angles to the section shown in Fig. 3.

As shown in Fig. 2, two short and broad steam-cylinders A are arranged side by side, their pistons (not shown) being connected with parallel rods F, which are secured by means of clamps E to the ends of two parallel boxes B. Two spirally-grooved shafts D extend through the said boxes and have bearings G, which are bolted to a stationary bed or timbers I. One of these shafts is continued, as shown at X, to form the power or driving shaft for any mechanism requiring to be driven. The said shafts are provided with meshing spur-gears C, so they both rotate together. The ends of the shafts D adjacent to the cylinders A are reduced, as shown at W, the same being conical and fitted in conical sockets (not shown) in the bearings G. Each shaft D has two spiral grooves, one of which is pitched in a direction opposite the other. Each shaft passes through a rotatable sleeve or hollow cylinder L, (see Fig. 4,) the said sleeve being provided with a device S for engaging the spiral groove K. As shown, the said device consists of a screw-pin having a roller P on its inner end, the said roller fitting in the spiral groove K and traveling therein as the boxes B reciprocate with the pistons of cylinder A. The boxes B are made in halves or two like parts which are secured together by screw-rods *m*, as shown in Fig. 3. The ends of the sleeves L are provided with lips or flanges Z, which abut the ends of the boxes B, as shown in Fig. 4. Antifriction rollers or balls O are arranged adjacent to the flanges Z, as shown.

Each sleeve or cylinder L has circumferential grooves which are provided with ratchet-teeth V. One set of these grooves has teeth projecting in one direction and the other set teeth projecting in opposite directions. As shown in Fig. 3, the pawl R, having a pivoted head Y, is arranged in a recess in the upper half of the boxes B and adapted for engagement with a coincident ratchet V of the sleeve L. Rods J pass through the boxes B, (see Figs. 1 and 2,) and to each of them are secured two pawls R, which project in opposite directions. (See dotted lines, Fig. 3.) When the rod J is rotated in one direction, one of the pawls R is dropped into engagement with one set of ratchets V and the other pawl will be removed from engagement with the ratchet whose teeth project in the opposite direction. It is therefore apparent that by this means the direction of rotation of the shafts D may be controlled as desired. As a means for shifting—that is, rotating—the rods J, and thereby throwing one of their sets of pawls into engagement with the ratchets V, I employ levers H, (see Figs. 1 and 2,) which are fixed upon the opposite rods J and pivoted together at their inner ends, and one of said levers is extended to form a handle by which they may be conveniently manipulated—*i. e.*, raised or depressed, as the case may be—to effect adjustment of the pawls R.

It will be understood that the sleeves L revolve free with the shafts D, except when locked by the pawls R, in which case the shafts will be rotated as the piston-rods F reciprocate. It will be further understood that two of the boxes B act on and rotate the shafts as they go out—that is to say, as the boxes move outward from the cylinders A—the grooves being so arranged that the shafts are rotated in opposite directions, and in the reverse movement the other two boxes rotate the shafts in the same manner. Thus the reciprocating movement of the piston-rods F is converted into continuous rotary motion of the driving-shaft X.

It will be seen that since there are two shafts the boxes B are guided thereby and no trackway or other supplemental guide is required, whereby friction is avoided and power saved.

Having thus described my invention, what I claim as new, and desire to secure by Letters Patent, is—

1. The combination, with two reciprocating piston-rods, of boxes secured thereto, spirally-grooved sleeves or cylinders arranged in said boxes and provided with circumferential ratchets of opposing pitch, two spirally-grooved shafts which are engaged with the sleeves, and pawls adapted for engaging the ratchets, substantially as shown and described.

2. The combination, with two piston-rods, and boxes secured thereto and adapted to reciprocate therewith, of two parallel shafts which are geared together and each provided with two spiral grooves pitched in opposite directions, a sleeve or cylinder having a device engaging the spiral grooves, and circumferential ratchets as described, pawls projecting in opposite directions and adapted to engage opposing ratchets, and means for shifting said pawls for reversing motion, substantially as shown and described.

3. The combination with piston-rods arranged parallel and two shafts also arranged parallel between the piston-rods and provided with spiral grooves pitched in opposite directions, gears applied to said shafts and meshing as described, sleeves or cylinders having flanged ends and applied to the spirally-grooved shafts, a device which locks the said cylinders with the said shafts, pawls projecting in opposite directions within the boxes, rods on which said pawls are secured, and lever mechanism for adjusting the pawls, substantially as shown and described.

JAMES L. CLAYLAND.

Witnesses:
  H. A. WARTMAN,
  HENRY FEWSTUE.